United States Patent

[11] 3,612,400

| [72] | Inventors | Douglas Johnson;<br>Henry M. Mar, both of Indianapolis, Ind. |
|---|---|---|
| [21] | Appl. No. | 42,679 |
| [22] | Filed | June 2, 1970 |
| [45] | Patented | Oct. 12, 1971 |
| [73] | Assignee | General Motors Corporation<br>Detroit, Mich. |

[54] VARIABLE JET PROPULSION NOZZLE
3 Claims, 12 Drawing Figs.

| [52] | U.S. Cl. | 239/265.19, 239/265.33, 239/265.41, 239/451 |
|---|---|---|
| [51] | Int. Cl. | B64c 15/06 |
| [50] | Field of Search | 239/265.19, 265.33, 265.37, 265.39, 265.41, 451 |

[56] References Cited

UNITED STATES PATENTS

| 3,004,385 | 10/1961 | Spears et al. | 239/265.41 |
| 3,214,904 | 11/1965 | Bailey et al. | 239/265.41 X |
| 3,214,905 | 11/1965 | Beavers et al. | 239/265.41 X |
| 3,367,579 | 2/1968 | Mehr | 239/265.41 |
| 3,426,974 | 2/1969 | Pendoley et al. | 239/265.39 |
| 3,511,441 | 5/1970 | Tumicki | 239/265.39 X |

FOREIGN PATENTS

| 326,076 | 7/1970 | Sweden | 239/265.33 |

Primary Examiner—M. Henson Wood, Jr.
Assistant Examiner—Edwin D. Grant
Attorneys—Paul Fitzpatrick and Jean L. Carpenter ABSTRACT: An exhaust duct and variable convergent-divergent propulsion nozzle for a supersonic turbofan engine. The nozzle includes a ring of leaves providing a convergent nozzle portion and a second ring of leaves downstream of the first defining a divergent nozzle portion. The downstream end of the divergent nozzle portion is connected to a ring of leaves defining a fairing around the nozzle. The fairing and divergent leaves are free to float radially at their downstream ends. The converging nozzle leaves and the forward end of the diverging nozzle leaves are actuated by a common linkage so as to coordinate the movement of the two and permit the floating movement of the downstream end of the nozzle. The structure, including the exhaust duct wall, is characterized by lightweight construction and arrangements for cooling the structure exposed to hot gas. Outward movement of the fairing leaves is limited by a ring of swinging links which includes stop means limiting their extending motion to a degree short of straightening the joints.

PATENTED OCT 12 1971
3,612,400
SHEET 1 OF 3
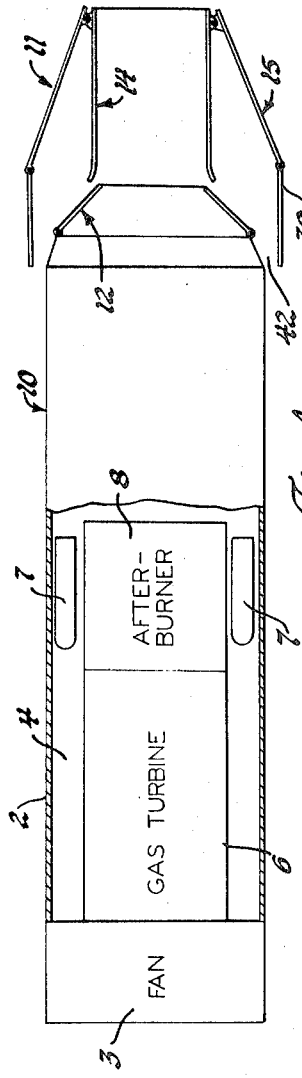
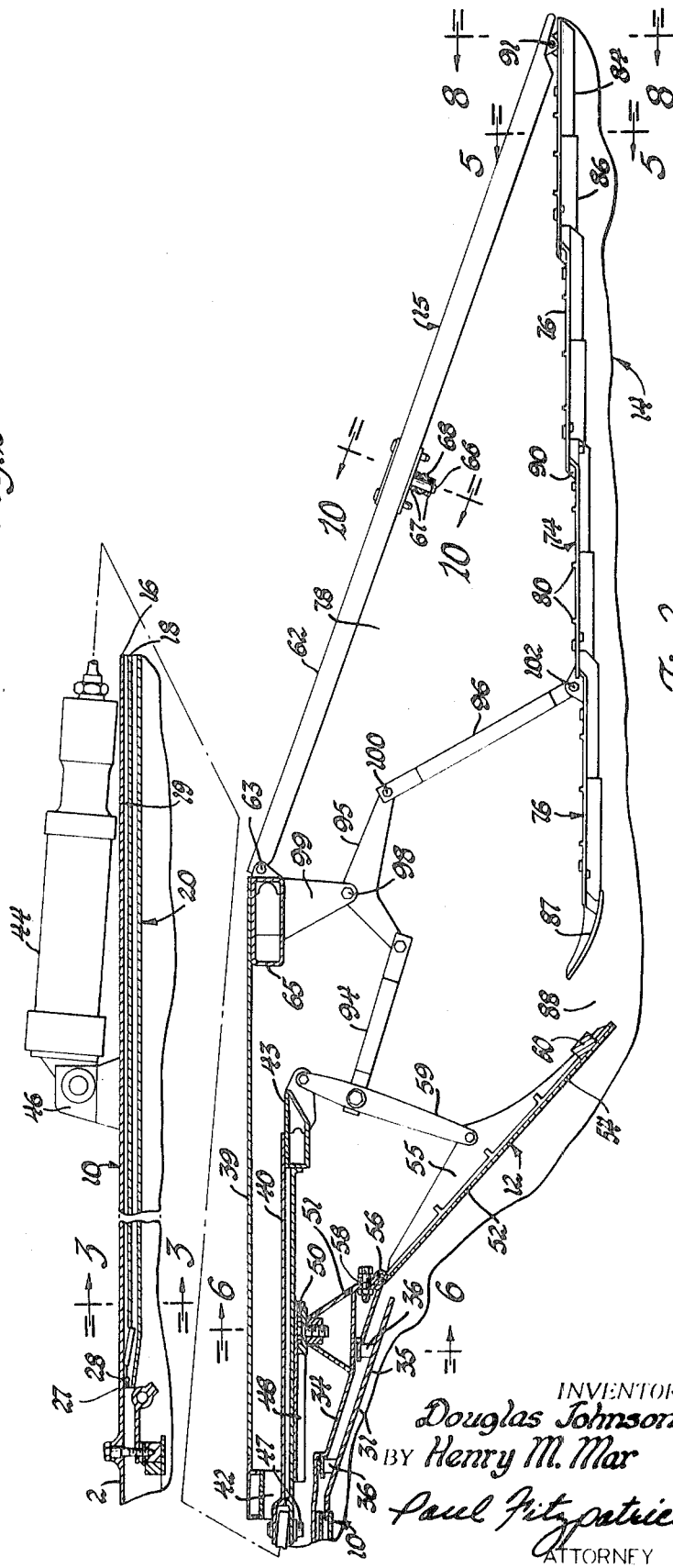
INVENTORS
Douglas Johnson &
BY Henry M. Mar
Paul Fitzpatrick
ATTORNEY

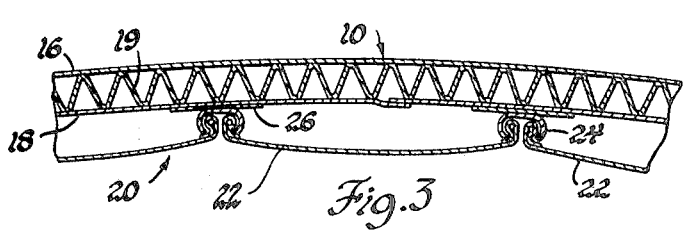
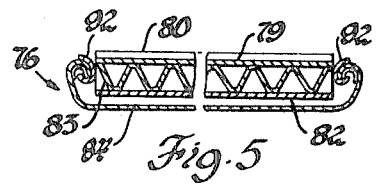
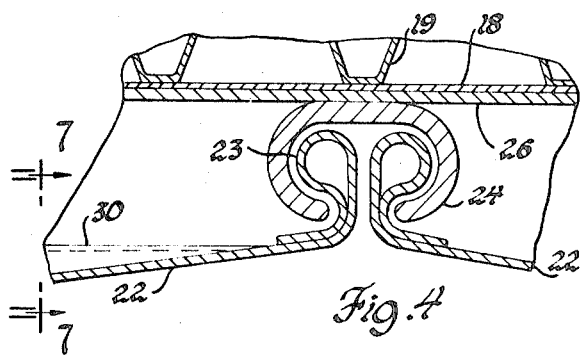
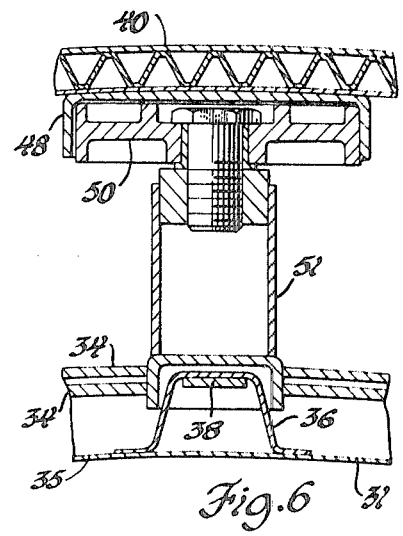
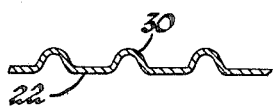
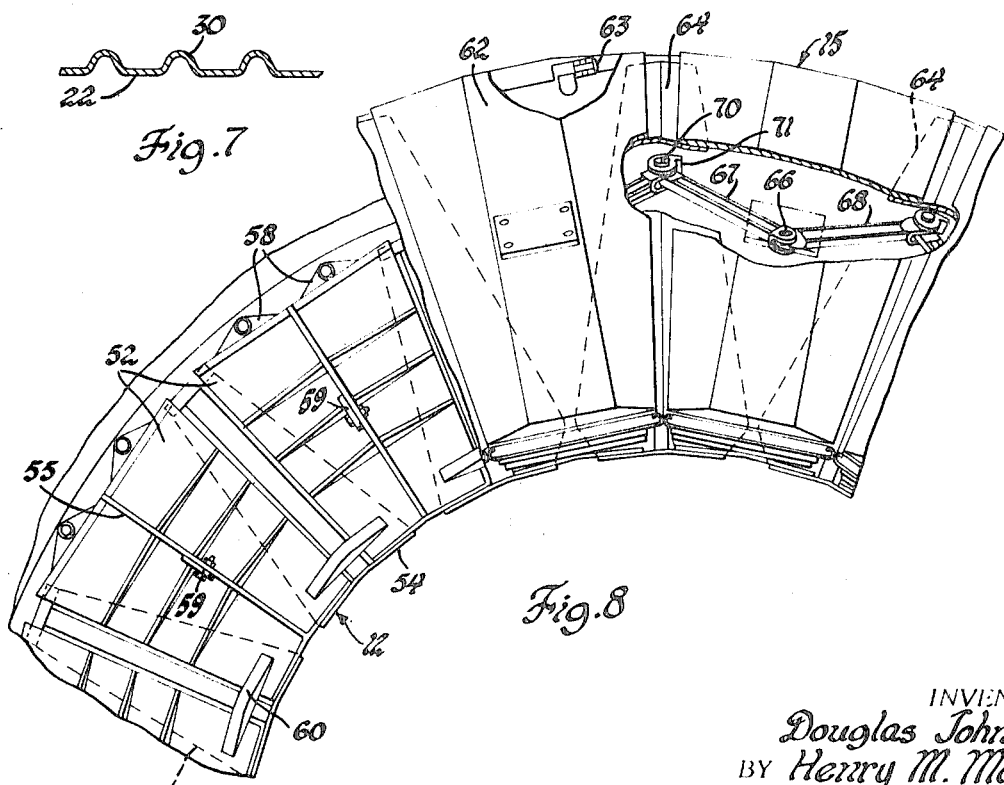

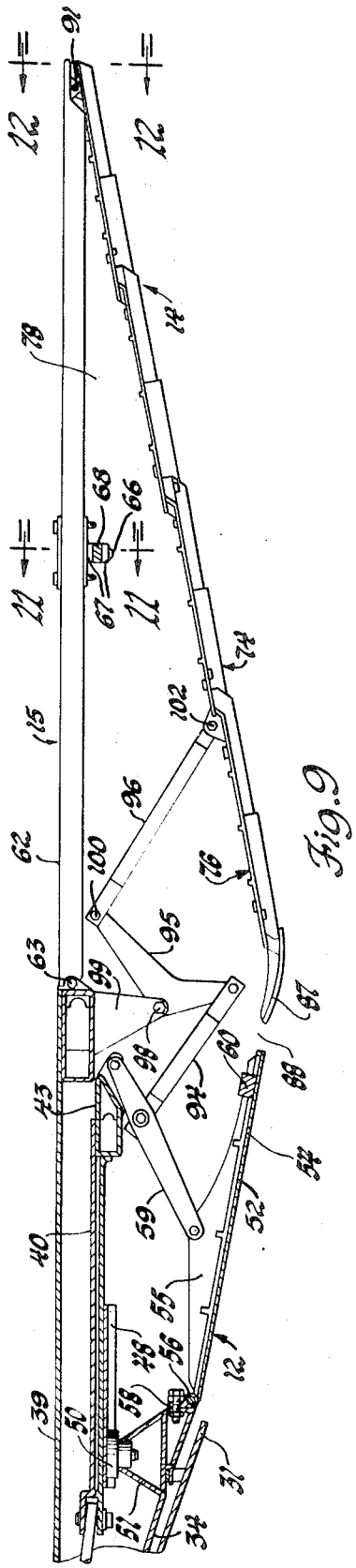
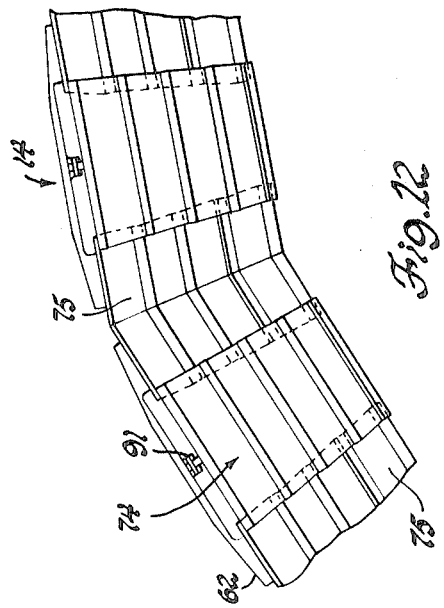
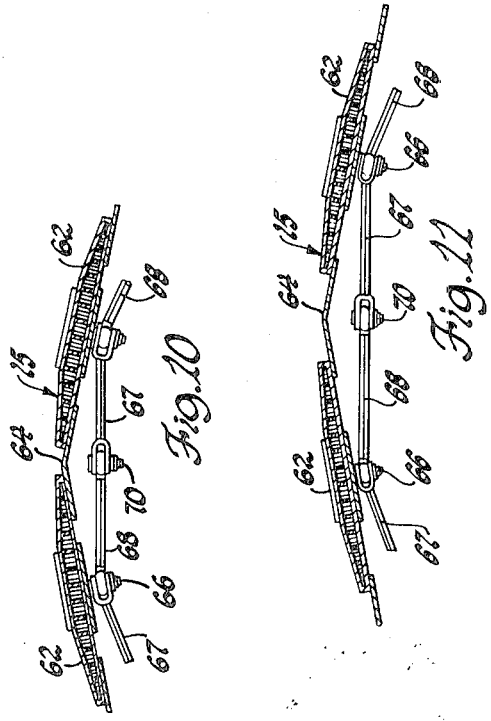

VARIABLE JET PROPULSION NOZZLE

Our invention relates to improved jet propulsion nozzles, particularly to those for propulsion of supersonic aircraft. As in all aircraft applications, it is extremely desirable to minimize weight, but the exhaust gases of a jet propulsion engine are quite hot, travel at high velocity, and are under a significant amount of pressure. It has long been recognized that convergent-divergent nozzle of variable throat and exit area is needed for efficient operation over the spectrum from low speed to full speed of the aircraft.

We consider ourselves to have conceived and developed a nozzle of this type which is particularly suited to the requirements of practice from the standpoint of light weight, flexible operation, reliability, and efficiency. The principal objects of our invention are to obtain a lightweight, low friction, simple construction of a variable propulsion nozzle for a thrust-augmented engine. Other objects are to improve the means for actuation of leaves of variable area nozzles and to improve means for cooling the walls of ducts carrying gases under high temperature and the leaves of multileaf variable area nozzle structures. A further object is to provide a linkage of the scissors type which provides a constraint on the maximum opening of a nozzle structure of the multileaf type.

Other objects and advantages of our invention will be apparent to those skilled in the art from the succeeding detailed description of the preferred embodiment of the invention and the accompanying drawings thereof.

FIG. 1 is a schematic drawing of an afterburning turbofan engine with a convergent-divergent jet nozzle.

FIG. 2 is a sectional view taken in a plane containing the axis of the engine showing the variable jet nozzle structure.

FIG. 3 is a section of the afterburner casing wall taken on the plane indicated by the line 3—3 in FIG. 2.

FIG. 4 is a greatly enlarged fragmentary portion of FIG. 3.

FIG. 5 is a transverse sectional view of a cooled nozzle segment taken on the plane indicated by the line 5—5 in FIG. 2.

FIG. 6 is a detail view of the nozzle actuating ring guiding mechanism taken on the plane indicated by the line 6—6 in FIG. 2.

FIG. 7 is a fragmentary sectional view taken on the plane indicated by the line 7—7 in FIG. 4.

FIG. 8 is a rear view of the nozzle taken on the plane indicated by the line 8—8 in FIG. 2, with parts removed and cut away.

FIG. 9 is a view similar to FIG. 2 showing the nozzle in wide open condition.

FIG. 10 is a sectional view through the fairing structure taken on the plane indicated by the line 10—10 in FIG. 2.

FIG. 11 is a view similar to FIG. 10 with the fairing in open nozzle position taken on the plane indicated by the line 11—11 in FIG. 9.

FIG. 12 is a fragmentary rear elevation view taken on the plane indicated by the line 12—12 in FIG. 9.

Referring first to FIG. 1, this is a schematic illustration of a known type of jet propulsion engine which may be termed a bypass turbojet or turbofan engine with duct burner, afterburner, and variable convergent-divergent nozzle. Such engines are well known and the details are immaterial to the present invention. An engine suitable for our present purpose is described in greater detail in U.S. Pat. No. 3,528,250 issued Sept. 15, 1970, to Douglas Johnson for By-Pass Engine with Afterburning and Compressor Bleed Air Heat Exchanger in By-Pass Duct, of common ownership with this application. The turbofan engine typically includes an annular casing 2 which encloses a fan 3 at the forward or air intake end of the engine. The fan discharges air into an annular fan duct 4 and into a gas turbine engine 6 which drives the fan. Air flowing through the fan duct from the fan may be heated by duct burners 7 and the exhaust from the gas turbine may be heated by an afterburner 8.

The portion 10 of the engine casing downstream of the duct burner and afterburner provides for completion of combustion and mixing of the hot gas from the fan and gas turbine, and carries it to a variable jet nozzle 11. The principal parts of the nozzle, as shown schematically in FIG. 1, are a variable convergent nozzle section 12, a variable divergent nozzle section 14, and a boattail fairing 15. Jet nozzles of this general type are disclosed in Spears et al. U.S. Pat. No. 3,004,385 and Gaubatz et al. U.S. Pat. No. 3,095,695.

The air driven by the fan 3 through the fan or bypass duct 2 is relatively cool but, after being heated by the fan duct burner or burners 7, becomes much hotter; also, the exhaust from the gas turbine is quite hot and becomes very hot after heating by the afterburner, particularly if the afterburner is in full operation. Hot gases, with combustion continuing, flow downstream through the duct 10 to the nozzle. The duct 10 provides support for the variable nozzle.

Therefore, the duct wall 10 from a point just downstream of these burners is of a multiple layer construction with provision for cooling to protect the wall against the very high temperature of the combustion gases within the duct 10. This structure, as shown in FIGS. 2, 3, and 4, comprises an outer wall or facing 16, an inner wall or facing 18, and a corrugated core 19 resistance welded to the inner and outer walls. This provides an extremely lightweight structure of suitable strength to contain the gas pressure and resist gravity and acceleration loads. To give an idea of the nature of this structure, the overall thickness of the casing in a preferred 40-inch diameter embodiment is 0.28 inches, the outer wall is 0.012 inches thick, the inner wall 0.008 inch, and the core is of 0.005-inch material. This structure provides passages extending longitudinally of the casing between the walls 16 and 18 through which cooling air is fed to cool the jet pipe casing.

A feature of the invention is provision for additional shielding and cooling of the duct 10. The inner wall is shielded from radiation from and scouring by the hot gas and provided with a cover for cooling airflow inside inner wall 18 by a liner 20 made up of a number of parallel generally rectangular panels 22. As shown more clearly in FIG. 4, each panel 22 is provided with a folded-back and recurved flange 23 the margin of which may be seam welded to the face of the panel. The flanges 23 of two adjacent panels 22 are slidably received in a C-shaped channel 24 extending longitudinally of the casing 10 within which the flanges 23 have a somewhat loose-fitting dovetail engagement. Channels 24 may be welded to reinforcing strips 26 in turn welded to the inner wall 18.

Referring now to FIG. 2, the forward end of the lined or cooled casing structure 10 at 27 is open so that fan discharge air flowing along the engine casing 2 may enter the forward end of the casing wall 10 where it flows between the walls 16 and 18 and also between the facing 20 and the wall 18. This air is at slightly higher static pressure, about 1 or 2 pounds per square inch, than the hot propulsion gases inside the liner 20. Thus, the pressure of the cooling air tends to force the panels 22 inwardly. Since these are suspended from the outer wall, they are in tension, and there is no problem of providing a liner of sufficient strength to withstand a crushing pressure from the cooling fluid. The load of the cooling air pressure is taken in tension on each panel 22 and serves to hold the flanges 23 snugly against the channels 24. The relatively strong and rigid cylindrical outer casing takes the outward force of the compressed gas in tension and thus there is no particular problem with resisting this pressure.

The panels 22 are slidable in the channels 24 for installation and also to accommodate relative expansion. A suitable key or dowel 28 (FIG. 2) at the forward end of the casing 10 locates each panel 22 axially of the exhaust duct. Another significant point about the liner panels 22 is the provision for differential expansion between the margins and median portions of the panels. In the particular structure illustrated, in which the liner 20 is about 30 inches long, the rear 11 inches suffers a very severe temperature gradient, this being where the exposure to hot gas is most severe. Since the flanges 23 are more protected from the hot gas than the central portion of panels 22, they tend to expand less. To provide for this, the rear portion of the face of each panel 22 has transverse corrugations 30 as indicated in FIGS. 4 and 7. The corrugations can fold slightly to accommodate the additional expansion in the central portion of the panels as compared to the margins.

It may be pointed out that approximately 5 percent of the engine airflow should be employed for cooling the casing 10 and, of this, approximately four-fifths is directed between the inner wall 18 and the liner 20.

We may now proceed to the convergent nozzle structure mounted at the downstream end of the exhaust casing 10. The convergent nozzle comprises a fixed upstream convergent portion 31 and a variable-area downstream convergent portion 12. The fixed nozzle structure, as shown most clearly in FIGS. 2 and 6, comprises an outer wall 34 and an inner wall 35 which define between them an annular passage into which the air flowing through the wall 10 discharges and from which it is discharged in a sheet over the inner face of the variable nozzle structure 12 for film cooling or isolation of that structure to a certain extent from the hot gases passing through the nozzle.

The inner wall 35 is supported from the outer wall 34 by two rings of straps 36 which mount over projections 38 fixed to the outer wall. The upstream end of the outer wall is fixed to outer facing 16 of the casing 10. The convergent nozzle is mounted within two concentric shrouds, a divergent nozzle shroud 39 and an actuating shroud 40. The shroud ring 39 is fixed to the casing 10 by suitable brackets (not illustrated) and may be considered to be a fixed extension of the jet pipe casing 10. The sections 10 and 39 are spaced from each other to define an annular entrance 42 for ram air which serves to cool and pressurize the divergent nozzle.

The actuating shroud 40, which is moved axially of the exhaust casing to vary the nozzle structures 12 and 14, is a double-walled structure with a strong box section actuating ring 43 at its aft end. Ring 43 is connected as will be described to the nozzle structures 12 and 14. Shroud 40 is moved axially of the exhaust duct by a set of four synchronized actuators 44 coupled to brackets 46 on the wall 10 and having connecting rods coupled by pins 47 to the forward or upstream edge of the shroud 40. Referring particularly to FIG. 6, the ring 40 is guided in its axial movement by a track and roller arrangement comprising four axially extending channels 48 fixed to the inner surface of the actuating ring and four rollers 50 each rotatably mounted on a bracket 51 fixed to the nozzle wall 34.

The convergent nozzle 12 is of a multileaf type. As shown in FIGS. 2 and 8, the nozzle in its preferred form comprises 16 segments 52 disposed in a ring and 16 sheet metal flaps 54 which bridge the gaps between adjacent segments. The segments 52 are cast plates of high temperature resisting alloy with ribs on the outer face for stiffening, including a rib 55 extending fore and aft along the center of each segment. The forward end of each segment 52 defines a hinge portion 56 of circular cross section which is mounted for rotation in a bracket 58 bolted to the rear end of the fixed convergent nozzle 34. The segments 52 are actuated from the ring 40 by links 59, each of which is hinged to the box section ring 43 at the rear end of shroud 40 and to the rib 55 of the segment. By comparing FIG. 2 to FIG. 9, it will be seen that rearward movement of the shroud 40 causes the convergent nozzle open.

The flaps 54 are coupled to the mounting brackets 58 and the segments 52 so as to move inwardly and outwardly with the segments and bridge the gap which opens between the segments as the area of the convergent nozzle is increased. The flaps are held against the segments by pressure within the nozzle when the engine is operating. To keep them in position when the engine is shut down, clips 60 fixed to each flap overlie the edges of the segments.

The boattail fairing 15 is a multileaf device with the leaves pivoted on the downstream end of the shroud 39 and with the downstream end of the fairing movable in and out, as will be seen by comparison of FIGS. 2 and 9. Like the convergent nozzle 12, the boattail fairing comprises segments 62 which are the principal structural elements and flaps 64 which bridge the gap between the segments, there being 16 of each. More specifically, the segments 62 are joined by a hinge connection at 63 to a box section stiffening ring 65 at the downstream end of the shroud 39. For lightness and strength, the segments 62 are a honeycomb sandwich structure having an outer and an inner skin with honeycomb core material welded to the skins. The flaps 64 which bridge the gap between adjacent segments 62, as shown most clearly in FIGS. 10 and 11, are simple pieces of sheet metal.

The nozzle structure includes means to limit the outward hinging movement of the boattail segments 62. A pivot pin 66 (FIGS. 2 and 8 to 11) extends inwardly from approximately the center of each segment 62. Each pivot pin 66 mounts arms 67 and 68 which are freely rotatable on the pin 66. The arms 67 and 68 of adjacent segments are hinged together by pins 70. Each arm 68 includes a projection 71 which engages the arm 67 to prevent further straightening out of the linkage as the nozzle expands shortly before the arms 67 and 68 are at a 180° angle to each other, thus preventing binding of the linkage and providing a direct positive termination of the opening movement of the boattail fairing.

The divergent nozzle 14 is also a ring of leaves, 16 of which are structural segments 74 and the other 16 are flaps 75.

Each segment 74 is made up of four stepped sections 76 successively from the forward to the rear end of the segment. The stepped construction provides for entrance of cooling air from the plenum or space 78 between the fairing 15 and divergent nozzle section 14. As shown most clearly in FIG. 5, the sections 76 are a sandwich construction with an outer facing 79 bearing transverse ridges 80, an inner facing 82, and a corrugated core 83, welded to the facings. The segment thus defines a cooling air path extending axially of the engine.

The sections 76 bear heat shields on their inner surfaces, the heat shields being designated 84 and 86, heat shields 86 being farther spaced from the inner facing 82 than the heat shields 84. Air from within space 76 can flow between the facing 82 and the heat shield 84 or 86. The stepped or shingled arrangement of the successive heat shields provides for flow of air from each heat shield over the radially inner exposed surface of the heat shield immediately downstream of it.

Cooling air flows into the first section 76 from a flow deflector 87 which, with similar curved entrance portions on the flaps, provides a converging entrance for air at 88 between the convergent nozzle 12 and the divergent nozzle 14. Air which flows on the outer surface of the deflector 87 may flow into and under the first section of the diverging segment 74. The upstream end of each succeeding segment is open, for example, as indicated at 90 in FIG. 2 so that there is a succession of airflows from within the space 78 through the structure of the segment and then over or through the succeeding heat shield downstream thereof. The rear end of the nozzle segment is open. The last section 76 is provided with ears which are coupled by hinge pins 91 to corresponding ears on the segments 62 of the boattail fairing.

As shown in FIG. 5, the heat shields 84 have recurved margins which are slidably fitted into channels 92 at each edge of the sections 76. These may be secured at one point against axial displacement while preserving freedom of expansion relative to the section of the diverging nozzle segment.

Returning now to the nozzle varying linkage, as previously stated, the converging nozzle 12 is controlled by the links 59 hinged to it and to the actuating ring 43 at the downstream end of movable shroud ring 40. Each link 59 is coupled through a link 94, a rocker arm 95, and a link 96 to a segment 74 of the divergent nozzle 14. Rocker arms 95 are mounted by pivots 98 to brackets 99 extending inwardly from the ring 65 at the rear end of shroud 39. The forward end of the rocker arm is pivoted to one end of the link 94, the other end of which is pivoted to the link 59 at about one-third of its length from its outer end. Links 96 are similarly pivoted at 100 to the rear end of the rocker arm and are pivoted at 102 to the segment at a point about 30 percent of its length from the upstream end. The rocker arm makes about a 120° angle between its effective lever arms. As will be apparent by comparison of FIGS. 2 and 9, as the ring 43 moves rearwardly, the segments 52 are moved outwardly, the link 94 is pushed rearwardly, rotating the rocker arm 95 counterclockwise as illustrated, and pulling outwardly and forwardly on the link 96. This exerts a force on the segment 74 of the divergent nozzle forcing it to move outwardly to increase the throat, and also exerts a component of force on the combination of the segments 62 and segments 74 tending to rotate the entire assembly clockwise about the pivot 63, as illustrated, thus tending to produce a convergence in the boattail and oppose divergence in the diverging portion of the nozzle.

The actual position of the terminus of the nozzle at the hinge joint 91 is determined primarily by the gas loadings on the nozzle. At maximum afterburning condition, the linkage of arms 67 and 68 which connect the segments 62 of the boattail limit its outward movement, thereby fixing the position of the discharge end of the convergent-divergent nozzle and preventing undue loading on the actuating mechanism of the nozzle.

In the operation of the engine, any suitable control means, the details of which are immaterial to our invention, acting by controlling the actuators 44, moves the actuating ring 43 forwardly and rearwardly. This movement definitely fixes the convergence and exit area of the convergent nozzle portion 12. It also fixes the location of the pivot 100 between link 96 and rocker arm 95. The pivot at 63 between the boattail and the casing is also fixed. The position of the diverging nozzle therefore is conditioned primarily by the pressures on the outside of the boattail, on the inside of the nozzle, and within the plenum 78 between the two. It is affected to some extent by the pull of the links 96 which tend to act against the pressure within the nozzle. The result, with proper proportioning of the nozzle and linkage, is that an efficient expansion within the nozzle and a smooth flow over the exterior of the engine are attained. In general, the nozzle throat is small under static operating conditions and increases with aircraft speed, and the exit area of the diverging portion of the nozzle is conditioned largely by presence or absence of afterburning.

Notwithstanding the highly efficient provisions for cooling the nozzle structures, it remains necessary to use high temperature resisting alloys and, in some cases, ceramic coatings to insure ample service life of the nozzle structure. However, our invention is not concerned with the metallurgy of the structures which may follow the state of the art for high temperature turbomachinery and combustion apparatus.

It will be clear to those skilled in the art from the foregoing description that the preferred embodiment of our invention provides a structure particularly suited to the requirements of practice, making possible use of lightweight structures providing for efficient cooling and actuation of the exhaust duct and variable nozzle.

The detailed description of the invention for the purpose of explaining the principles thereof is not to be considered as limiting or restricting the invention, since many modifications may be made by the exercise of skill in the art.

We claim:

1. A variable convergent-divergent jet propulsion nozzle comprising an annular casing; a ring of leaves hinged to the casing defining a variable convergent nozzle, the casing extending past the variable convergent nozzle; a ring of leaves hinged to and extending downstream from the casing defining a fairing; a ring of leaves defining a variable divergent nozzle with the upstream ends of the leaves disposed adjacent to the variable convergent nozzle exit and the downstream ends of the divergent nozzle leaves hinged to the downstream ends of the fairing leaves; a nozzle varying actuating ring mounted on the interior of the casing for translation axially of the casing; and linkage connecting the actuating ring to the convergent nozzle leaves and divergent nozzle leaves, the linkage comprising, in combination, first links hinged to the actuating ring and the convergent nozzle leaves so as to open the convergent nozzle upon movement of the actuating ring axially of the casing; a rocker arm corresponding to each first link hinged to the casing for generally radial movement of the ends of the arm; second links connecting one end of each rocker arm to an intermediate point of the corresponding first link; and third links connecting the other end of each rocker arm to the divergent nozzle leaves at a point substantially spaced from the upstream ends of the divergent nozzle so as to open the entrance to the divergent nozzle concurrently with opening of the convergent nozzle, the downstream ends of the fairing and divergent nozzle leaves being freely movable in response to gas pressures on the leaves.

2. A variable convergent-divergent jet propulsion nozzle comprising an annular casing; a ring of leaves hinged to the casing defining a variable convergent nozzle, the casing extending past the variable convergent nozzle; a ring of leaves hinged to and extending downstream from the casing defining a fairing; a ring of leaves defining a variable divergent nozzle with the upstream ends of the leaves disposed adjacent to the variable convergent nozzle exit and the downstream ends of the divergent nozzle leaves hinged to the downstream ends of the fairing leaves; a nozzle varying actuating ring mounted on the interior of the casing for translation axially of the casing; and linkage connecting the actuating ring to the convergent nozzle leaves and divergent nozzle leaves, the linkage comprising, in combination, first links hinged to the actuating ring and the convergent nozzle leaves so as to open the convergent nozzle upon rearward movement of the actuating ring; a rocker arm corresponding to each first link hinged to the casing for generally radial movement of the ends of the arm; second links connecting the forward end of each rocker arm to an intermediate point of the corresponding first link; and third links connecting the rearward end of each rocker arm to the divergent nozzle leaves at a point substantially spaced from the upstream ends of the divergent nozzle so as to open the entrance to the divergent nozzle concurrently with opening of the convergent nozzle, the downstream ends of the fairing and divergent nozzle leaves being freely movable in response to gas pressure on the leaves.

3. A variable convergent-divergent jet propulsion nozzle comprising an annular casing; a ring of leaves hinged to the casing defining a variable convergent nozzle, the casing including a portion extending past the variable convergent nozzle and defining an air inlet; a ring of leaves hinged to and extending downstream from the casing defining a fairing; a ring of leaves defining a variable divergent nozzle with the upstream ends of the leaves disposed adjacent to the variable convergent nozzle exit to define an air entrance between the convergent and divergent nozzles; the downstream ends of the divergent nozzle leaves being hinged to the downstream ends of the fairing leaves; a nozzle varying actuating ring mounted on the interior of the casing for translation axially of the casing; linkage connecting the actuating ring to the convergent nozzle leaves and divergent nozzle leaves, the linkage comprising, in combination, first links hinged to the actuating ring and the convergent nozzle leaves so as to open the convergent nozzle upon rearward movement of the actuating ring; a rocker arm corresponding to each first link hinged to the casing for generally radial movement of the ends of the arm; second links connecting the forward end of each rocker arm to an intermediate point of the corresponding first link; and third links connecting the rearward end of each rocker arm to the divergent nozzle leaves at a point substantially spaced from the upstream ends of the divergent nozzle so as to open the entrance to the divergent nozzle concurrently with opening of the convergent nozzle, the downstream ends of the fairing and divergent nozzle leaves being freely movable in response to gas pressures on the leaves; and a swinging-arm linkage connecting the fairing leaves together and having a maximum extension positively limiting the opening of the fairing.